(12) United States Patent
Acar et al.

(10) Patent No.: US 7,100,446 B1
(45) Date of Patent: Sep. 5, 2006

(54) DISTRIBUTED-MASS MICROMACHINED GYROSCOPES OPERATED WITH DRIVE-MODE BANDWIDTH ENHANCEMENT

(75) Inventors: Cenk Acar, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/895,508

(22) Filed: Jul. 20, 2004

(51) Int. Cl.
G01P 9/04 (2006.01)
G01C 19/00 (2006.01)

(52) U.S. Cl. ............... 73/504.13; 73/504.12
(58) Field of Classification Search ............ 73/504.02, 73/504.04, 504.12, 504.13, 504.14, 504.15
See application file for complete search history.

(56) References Cited

U.S. PATENT DOCUMENTS

| | | | |
|---|---|---|---|
| 5,889,207 A * | 3/1999 | Lutz | 73/504.13 |
| 6,244,111 B1 * | 6/2001 | Funk | 73/504.13 |
| 6,349,597 B1 * | 2/2002 | Folkmer et al. | 73/504.02 |
| 6,823,733 B1 * | 11/2004 | Ichinose | 73/504.02 |
| 6,859,113 B1 * | 2/2005 | Giousouf et al. | 331/154 |

* cited by examiner

Primary Examiner—Helen Kwok
(74) Attorney, Agent, or Firm—Daniel L. Dawes

(57) ABSTRACT

A micromachined z-axis rate gyroscope with multidirectional drive-mode has an increased drive-mode bandwidth for relaxing mode-matching requirement in which the drive and sense modes are completely decoupled. By utilizing multiple drive-mode oscillators with incrementally spaced resonance frequencies, wide-bandwidth response is achieved in the drive-mode, leading to reduced sensitivity to structural and thermal parameter fluctuations. Quadrature error and zero-rate-output are also minimized, due to the enhanced decoupling of multi-directional linear drive-mode and the torsional sense-mode. Bulk-micromachined prototypes have been fabricated in a one-mask SOI-based process, and is experimentally characterized.

28 Claims, 16 Drawing Sheets

DISTRIBUTED-MASS MICROMACHINED GYROSCOPES OPERATED WITH DRIVE-MODE BANDWIDTH ENHANCEMENT

BACKGROUND OF THE INVENTION

1. Field of the Invention

The invention is in the field of micromachined z-axis rate gyroscopes and in particular to gyroscopes with a multidirectional drive-modes.

2. Description of the Prior Art

With their dramatically reduced cost, size, and weight, MEMS gyroscopes potentially have a wide application spectrum in the aerospace industry, military, automotive industry and consumer electronics market. The applications are diverse, including high performance navigation and guidance systems, automotive safety systems like yaw and tilt control, roll-over protection and next generation airbag and antilock brake systems. A wide range of consumer electronics applications include image stabilization in video cameras, virtual reality products, pointing devices, and game industry. Miniaturization of gyroscopes also enable higher-end applications like micro-satellites, microrobotics, and even implantable devices to cure vestibular disorders.

Almost all existing micromachined rate gyroscopes operate on the vibratory principle of a single proof mass suspended above the substrate. The proof mass is supported by anchored flexures, which-serve as the flexible suspension between the proof mass and the substrate, making the mass free to oscillate in two orthogonal directions. FIG. 2a is a diagram of a prior art gyroscope showing the drive direction (x-Axis) and the sense direction (y-Axis). The overall dynamical system is simply a two degrees-of-freedom (2-DOF) mass-spring-damper system, where the drive direction is excited by the electrostatic drive forces, and the sense direction is excited by the rotation-induced Coriolis force.

Decomposing the motion into the two principle oscillation directions, the drive direction x and the sense direction y, the simplified equations of motion become $$m\ddot{x}+c_x\dot{x}+k_x x=F_d\ m\ddot{y}+c_y\dot{y}+k_y y=-2m\Omega_z\dot{x}. \quad (1)$$

where Fd is the drive-mode control force that provides constant-amplitude drive mode oscillations. The final term, $2m\Omega_z\ dx/dt$, in the equation is the rotation-induced Coriolis force, which causes dynamic coupling between the oscillation axes, and is used for angular rate measurement.

In most of the reported micromachined vibratory rate gyroscopes, the proof mass is driven into resonance in the drive direction by an external sinusoidal force, which are generally the electrostatic forces applied by comb-drive structures. When the gyroscope is subjected to an angular rotation, the Coriolis force is induced in the y-direction. If the drive and sense resonant frequencies are matched, the Coriolis force excites the system into resonance in the sense direction, as well. The resulting oscillation amplitude in the sense direction is proportional to the Coriolis force and, thus, to the angular velocity to be measured.

To achieve the maximum possible gain, the conventional gyroscopes are generally designed to operate at or near the peak of their resonance curve. This is typically achieved by designing and electrostatically tuning the drive and sense resonant frequencies to match. Alternatively, the sense-mode is designed to be slightly shifted from the drive-mode to improve robustness and thermal stability, while sacrificing gain. The drive and sense mode matching (or near-matching) requirement in vibratory gyroscopes renders the system response very sensitive to variations in system parameters, e.g. due to fabrication imperfections and fluctuations in operating conditions, which shift the drive or sense resonant frequencies. For the devices packaged in vacuum to enhance the sensitivity, the bandwidth of the resonance peaks is extremely narrow; leading to much tighter mode matching requirements. Extensive research has focused on design of symmetric drive and sense-mode suspensions for mode-matching and minimizing temperature dependence.

However, especially for lightly-damped devices, the mode-matching requirement is well beyond fabrication tolerances; and none of the symmetric designs can provide the required degree of mode-matching without feedback control. Furthermore, as the modes are matched more closely, the mechanical interference between the modes becomes more significant, resulting in operation instability and drift.

In order to suppress coupled oscillation and drift and to minimize the resulting zero-rate drift, various devices have been reported employing independent suspension systems for the drive and sense modes. The approach of decoupling drive and sense modes led to the first integrated commercial MEMS gyroscopes produced by Analog Devices. We have previously reported gyroscope systems that offer improved robustness by expanding the degree-of-freedom of the dynamical system with the expense of sacrificing response gain. We also reported increased-DOF gyroscope systems with decoupled modes to minimize quadrature error.

However, the scarce capabilities of photolithography and micro-fabrication processes, and the resulting inherent imperfections in the mechanical structure significantly limits the performance, stability, and robustness of MEMS gyroscopes. Thus, fabrication and commercialization of high-performance and reliable MEMS gyroscopes that require picometer-scale displacement measurements of a vibratory mass have proven to be extremely challenging.

The limitations of the photolithography-based micromachining technologies defines the upper-bound on the performance and robustness of micromachined gyroscopes. The mode-matching problem and the quadrature error due to the resulting fabrication imperfections are the two major challenges in MEMS gyroscope design.

BRIEF SUMMARY OF THE INVENTION

The illustrated embodiment of the invention is a distributed-mass micromachined gyroscope comprising a supporting frame having a center of symmetry and multiple drive mode oscillators distributed symmetrically around the center of the supporting frame and coupled thereto. The multiple drive mode oscillators are arranged and configured to have incrementally spaced drive mode resonance frequencies to allow all of the multiple drive mode oscillators to be excited together to jointly generate a resultant Coriolis torque, so that the Coriolis torque defines a wide-bandwidth drive mode.

In one embodiment, the multiple drive mode oscillators each include comb drive actuation, and in another embodiment the multiple drive mode oscillators each include parallel plate actuation. The invention is realized in various embodiments which are variously described below.

The frame lies in a tangential plane and the multiple drive mode oscillators each have a drive axis lying in the tangential plane and are driven in phase with each other.

The frame has a multiplicity of tangent sides with a corresponding tangential direction. Each of the multiple drive mode oscillators are driven in a direction normal to one of the multiplicity of tangent sides of the frame. Each of the multiple drive mode oscillators are constrained in the tangential direction with respect to the frame.

The frame has an anchored center and the multiple drive mode oscillators are distributed symmetrically around the anchored center of the frame.

The drive axis of each of the multiple drive mode oscillators is radially directed with respect to the anchored center of the frame.

Each of the multiple drive mode oscillators includes a corresponding sensing capacitor and in the presence of an angular rotation rate about a z axis, which is perpendicular to the frame, Coriolis forces are induced on each of the multiple drive mode oscillators orthogonal to each corresponding drive-mode oscillation direction so that each of the induced Coriolis forces lie in the tangential direction in the plane of the frame and combine to generate a resultant torque on the frame with the net Coriolis torque exciting the frame into torsional oscillations about the z-axis, which are detected by the sensing capacitors for angular rate measurement.

Each of the multiple drive mode oscillators includes a drive actuation which applies a corresponding drive force to the drive mode oscillator and a sensing electrode attached to the frame to sense movement of the drive mode oscillator. The multiple drive mode oscillators have radial symmetry with respect to each other so that the drive forces applied to the drive-mode oscillators cancel out in all directions due to the radial symmetry and the net driving force on the structure or system reduces to substantially zero. The sensing electrodes do not deflect with respect to the frame due to the drive-mode oscillations, so that instability and drift due to mechanical coupling between the drive and sense modes is minimized, and complete decoupling of multi-directional linear drive-mode and the rotational sense-mode is achieved.

The gyroscope is nominally operated in a flat region of the Coriolis torque frequency response by arrangement of the incremental spacing of drive mode resonance frequencies. The sense-mode resonance frequency of the gyroscope is designed to be in the same frequency band so that the requirement on the degree of mode-matching is relaxed and robustness against structural and thermal parameter fluctuations is achieved.

The frequency separation of the incremental spacing of drive mode resonance frequencies between each of the multiple drive mode oscillators is less than the bandwidth of one oscillator.

Each of the multiple drive mode oscillators includes a parallel plate actuator and each of the multiple drive mode oscillators are electrostatically tuned to achieve uniform and smaller separation of drive mode resonance frequencies.

Each of the multiple drive mode oscillators includes a sensing electrode with a corresponding sense-mode resonance frequency with the sense-mode resonance frequency being designed higher than the corresponding drive-mode frequency for tuning down to the center driving frequency.

The invention is also defined as a method of operating a distributed-mass micromachined gyroscope having the design embodiments described above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The invention provides a micromachined z-axis rate gyroscope with multidirectional drive-mode, that increases the drive-mode bandwidth for relaxing mode-matching requirement, and completely decouples the drive and sense modes. By utilizing multiple drive-mode oscillators with incrementally spaced resonance frequencies, wide-bandwidth response is achieved in the drive-mode, leading to reduced sensitivity to structural and thermal parameter fluctuations. Quadrature error and zero-rate-output are also minimized, due to the enhanced decoupling of multi-directional linear drive-mode and the torsional sense-mode. Bulk-micromachined prototypes have been fabricated in a one-mask SOI-based process, and experimentally characterized.

The distributed-mass gyroscope (DMG) of the invention advances the art by employing multiple linear drive-modes completely decoupled from the rotational sense-mode; while providing a wide-band robust drive-mode. Here we present the design and detailed characterization results of the second-generation prototypes employing two different drive-mode actuation mechanisms: (1) comb drive actuation for large drive amplitudes, and (2) parallel plate actuation for a wide electrostatic tuning range.

The Gyroscope Structure

Figure 1:
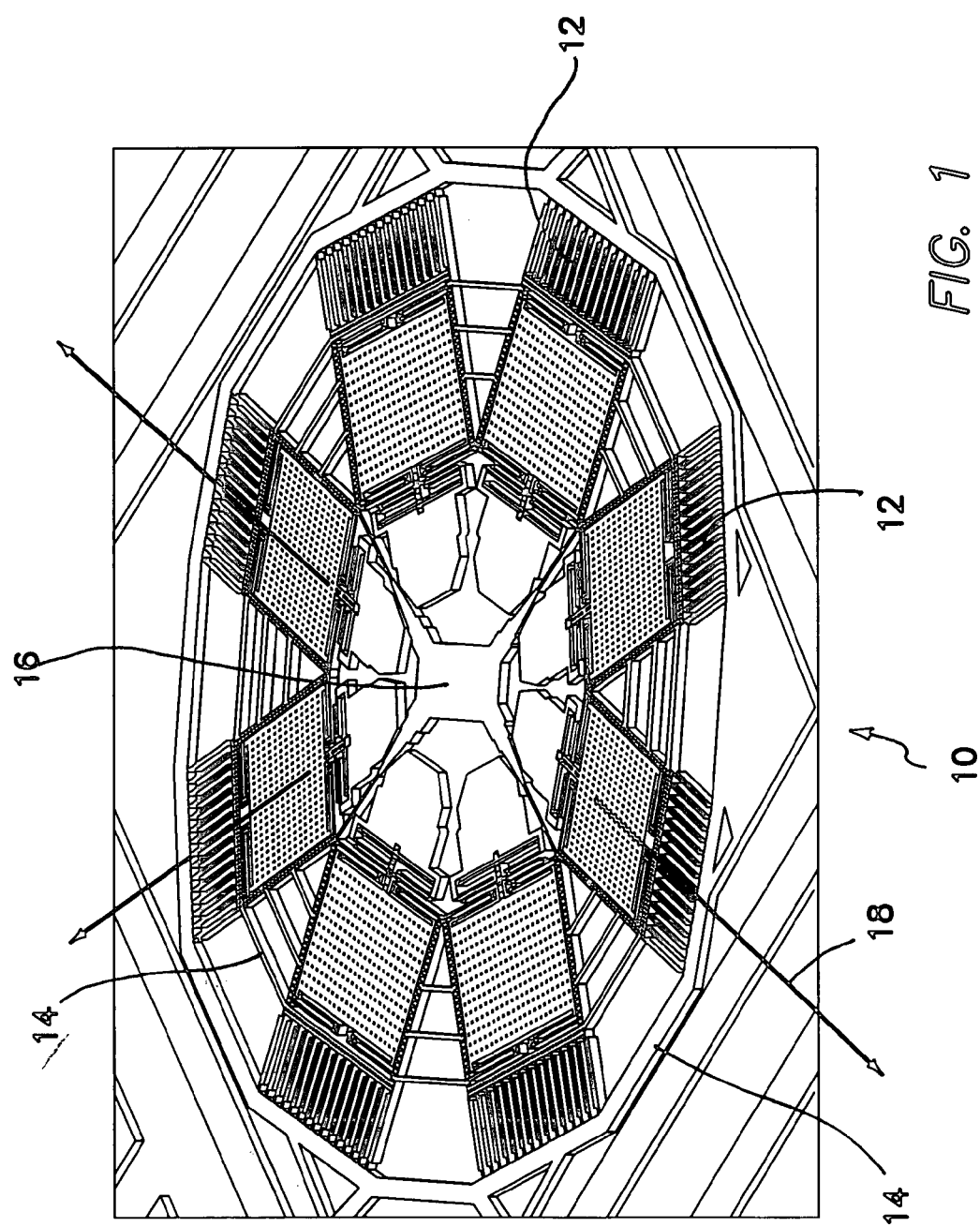
FIG. 1 is a microphotograph of a gyroscopic system according to the invention.
Figure 2A:
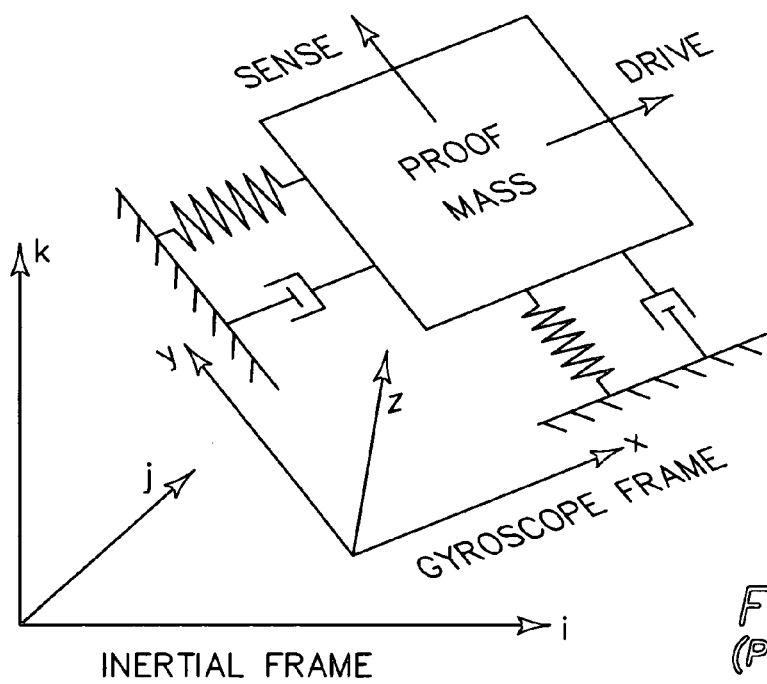
FIG. 2a is a dynamic diagram of prior art 2 degree-of-freedom micromachined gyroscopes.
Figure 3:
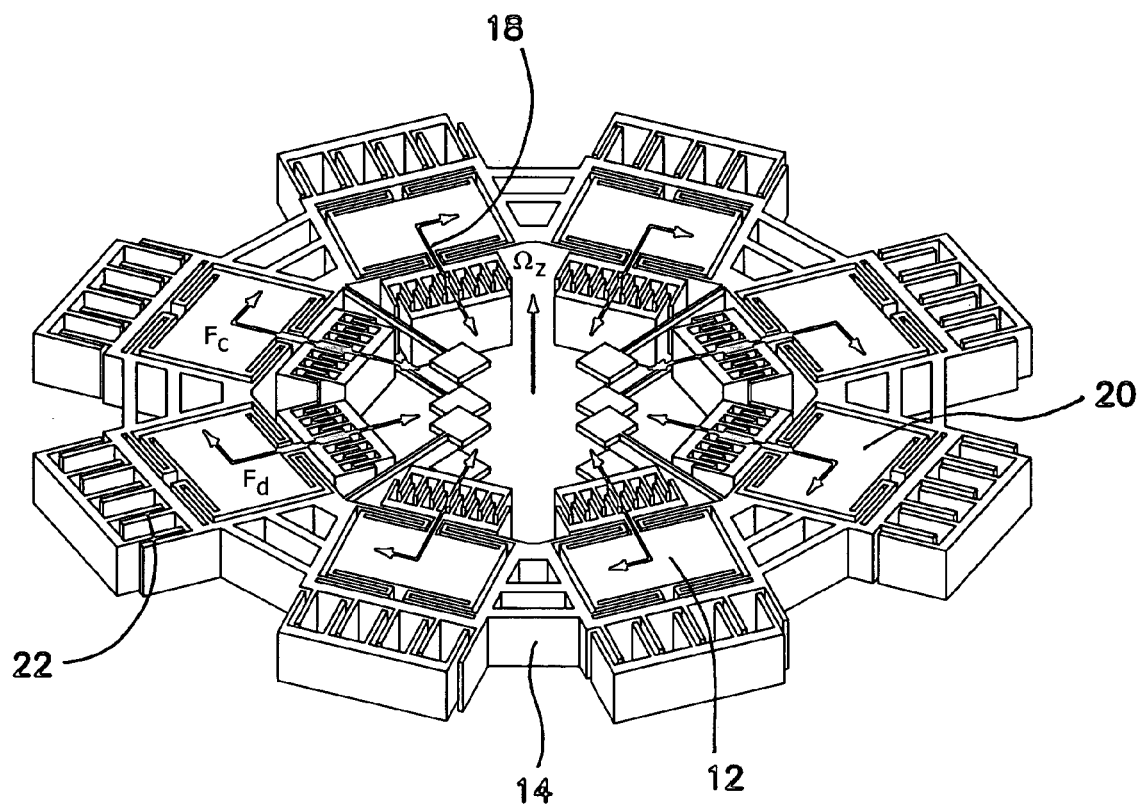
FIG. 3 is a diagram of the gyroscopic system of FIG. 1.

The micromachined gyroscope system 10 of the invention increases the drive-mode response bandwidth without sacrificing gain by utilizing multiple resonators in the drive-mode, and effectively decouples the drive and sense modes with the multi-directional linear drive-mode and a rotational sense mode. The design concept is based on forming multiple drive mode oscillators 12, distributed symmetrically around the anchored center 16 of a supporting frame 14. The distributed drive-mode oscillators 12 are driven in-phase along the axes 18 normal to the tangents of the supporting frame 14, and are constrained in the tangential direction with respect to the supporting frame 14. In the presence of an angular rotation rate about the z axis, which is perpendicular to frame 14, the Coriolis forces are induced on each proof mass 20 orthogonal to each drive-mode oscillation direction 18 as depicted in the microphotograph of FIG. 1 and diagrammatically depicted in FIG. 3. Thus, each of the induced Coriolis force vectors lie in the tangential direction in the plane of frame 14, combining to generate a resultant torque on the supporting frame 14. The net Coriolis torque excites the supporting frame 14 into torsional oscillations about the z-axis, which are detected by sensing capacitors 22 for angular rate measurement.

The multi-directional and axi-symmetric nature of the drive-mode oscillators 12 has several benefits over a conventional gyroscope design. Firstly, since the drive forces applied to the drive-mode oscillators 12 cancel out in all directions due to the radial symmetry, the net driving force on the structure or system 10 reduces to zero. The symmetry of the design is assured in the fabrication process, where the complete structure is defined lithographically in one mask, eliminating the possibility of mask misalignment.

Furthermore, the sensing electrodes 22 attached to the supporting frame 14 do not deflect due to the drive-mode oscillations. Secondly, instability and drift due to mechanical coupling between the drive and sense modes is minimized, since the structure allows complete decoupling of multi-directional linear drive-mode and the rotational sense-mode. Thus, zero rate-output and quadrature errors are suppressed effectively in the presence of structural imperfections. The symmetry of the drive-mode oscillator structure about several axes 18 also cancels the effects of directional residual stresses, and elastic anisotropy of the structural material.

The Coriolis Response

In the illustrated embodiment, the distributed drive-mode oscillators 12 are driven in-phase towards the center 16, and constrained in the tangential direction with respect to the supporting frame 14. The constrained dynamics of each proof mass 20 along the associated drive axis 18 with respect to the supporting frame 14 reduces to:

$$m_i \ddot{x}_i + c_x \dot{x}_i + k_x x_i = F_d \quad (2)$$

where $m_i$ is the ith proof-mass, and $x_i$ is the drive-mode oscillation amplitude of the ith mass. Thus, in the presence of an angular rotation rate about the z-axis, the Coriolis forces, which are proportional to drive direction oscillation amplitudes, induced on each proof mass 20 are:

$$F_{ci} = 2m_i \Omega_z \dot{x}_i \quad (3)$$

The rotation-induced Coriolis forces are orthogonal to each drive-mode oscillation direction 18. Thus, each of the induced Coriolis force vectors lie in the tangential direction, combining to form a resultant torque on the supporting frame 14. The net Coriolis torque generated as the combination of each Coriolis force becomes:

$$\overline{M}_c = \sum_{i=1}^{n} \bar{r}_c \times \bar{F}_{ci} = \sum_{i=1}^{n} 2 r_c m_i \Omega_z \dot{x}_i \cdot \hat{k} \quad (4)$$

where $r_c$ is the position vector of the oscillator center of mass, and k is the unit vector in the z-direction. The Coriolis torque $M_c$ excites the supporting frame 14 into torsional oscillations about the z-axis, which are detected by sensing capacitors 22, providing measurement of angular rate. Thus, the equation of motion of the supporting frame in the sense-direction is $$I_z \ddot{\phi} + D_z \dot{\phi} + K_z \phi = M_c, \quad (5)$$

where φ is the torsional deflection of the supporting frame 14, $I_z$ denotes the moment of inertia of the supporting frame 14 combined with the proof masses 20, $D_z$ is the sense-mode rotational damping ratio, and $K_z$ is the torsional stiffness of the suspension structure or frame 14.

Wide-Bandwidth Operation for Improving Robustness

Figure 4A:
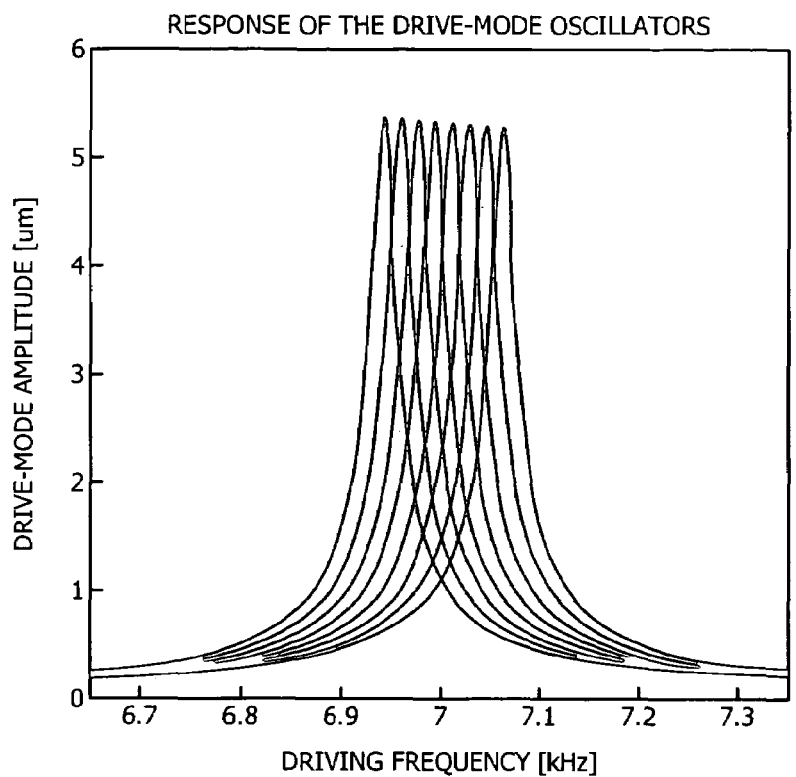
FIG. 4a is a graph showing the distribution of the frequency responses of the drive mode oscillators of FIGS. 1 and 3.

The most prominent advantage of the invention is the capability to provide a wide-bandwidth operation region in the drive-mode frequency response. This is achieved by designing or actively tuning the resonance frequency of each drive-mode oscillator 12 to be incrementally spaced as graphically depicted in FIG. 4a, where drive mode amplitude is graphed against driving frequency for oscillators 12 shown in FIGS. 1 and 3. Since the tangential Coriolis forces induced on each proof mass 20 jointly generate a resultant torque on the supporting frame 14, a constant total Coriolis torque is achieved over a wide range of driving frequencies as shown graphically in FIG. 4b.

Figure 4B:
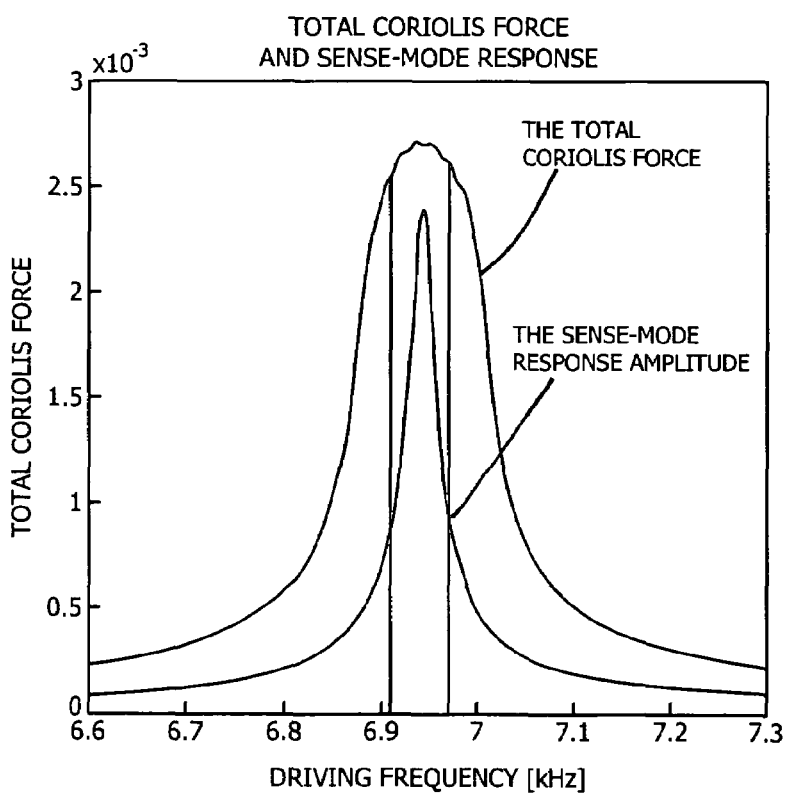
FIG. 4b is a graph showing the total Coriolis force and sense mode frequency response of the system of FIGS. 1 and 3.

The device 10 is nominally operated in the flat region of the Coriolis torque frequency response. Thus, fluctuations in system parameters that shift oscillator resonance frequencies will not result in a significant change in the total Coriolis torque through the operation frequency band. If the sense-mode resonance frequency is designed to be accommodated in the same frequency band as shown in FIG. 4b, the requirement on the degree of mode-matching is relaxed, and robustness against structural and thermal parameter fluctuations is achieved.

Figure 5:
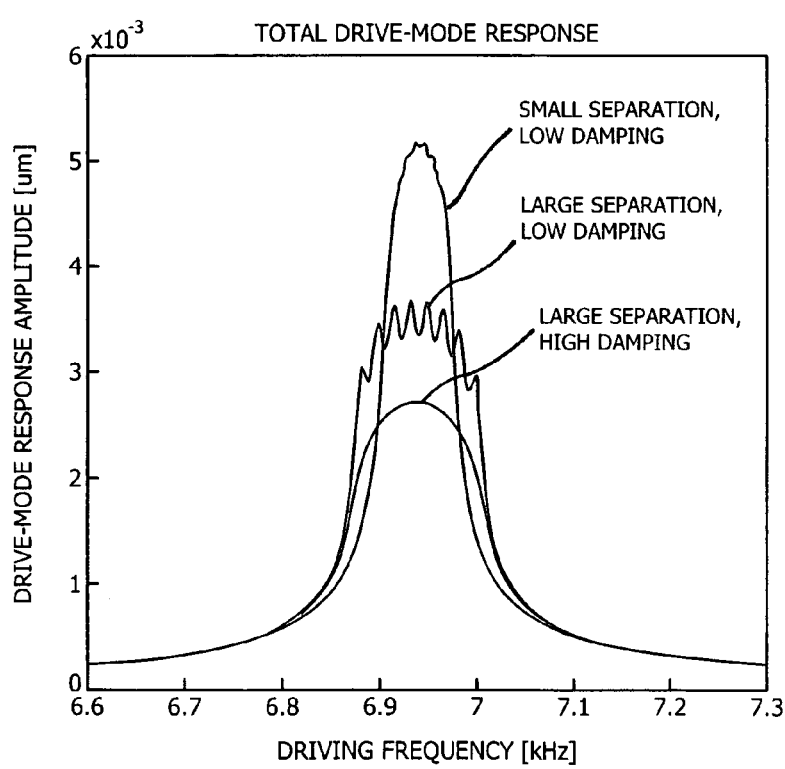
FIG. 5 is a graph of the effect of damping and resonance frequency separation on the drive-mode response.

It should be noticed that the resonance frequency separation of the oscillators 12 are dictated by the bandwidth of the response, which is determined by damping. In order to obtain a flat operation region in the drive-mode, the frequency separation should be less than the bandwidth of one oscillator 12. If the separation of frequencies is large for low damping resonators, spacing of the resonance peaks become significant in the response as graphically depicted in FIG. 5, and the flat operation region will not be achieved in the drive-mode response.

Sensitivity and Robustness Analyses

The illustrated embodiment allows one to widen the operation frequency range of the gyroscope drive-mode to achieve improved robustness, while sacrificing the response amplitude. The optimal compromise between amplitude of the response and bandwidth effecting sensitivity and robustness respectively can be obtained by selecting the frequency increments of the drive-mode oscillators 12.

Figure 6A:
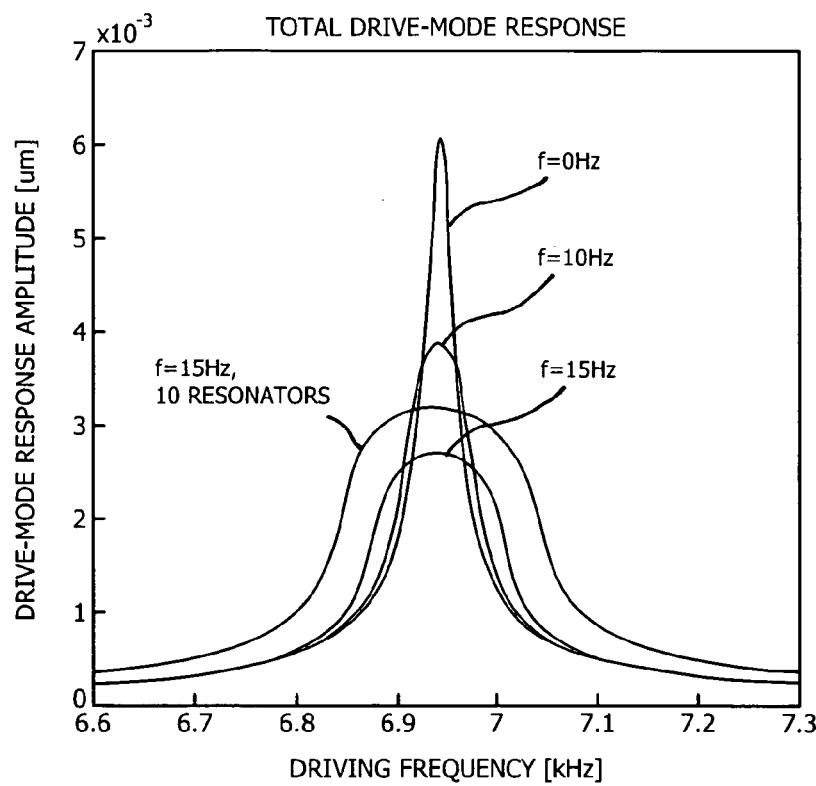
FIG. 6a is a graph illustrating the effect of frequency separation on the response gain and bandwidth affecting sensitivity and robustness respectively. The gain is maximized for zero frequency separation, and the overall bandwidth increases proportional to spacing.

As a numerical example, the response of a device consisting of 8 drive-mode oscillators 12 with resonance frequencies located at 6.87 to 6.99 kHz and a frequency spacing of 15 Hz will be analyzed. For 1°/sec input angular rate and a Q factor of 100 in the drive and sense modes, the supporting frame 14 of the distributed-mass gyroscope 10 will have an amplitude of response equal to $2.8 \times 10^{-3}$ μm at the sensing electrodes 22. If the frequency spacing of the drive-mode oscillators 12 is decreased from 15 Hz to 10 Hz, the amplitude of the response in the sense direction will increase from $2.8 \times 10^{-3}$ μm to $3.9 \times 10^{-3}$ μm; while the response bandwidth will decrease from 200 Hz to 140 Hz, which is still over an order of magnitude larger than the bandwidth of a single-mass conventional gyroscope. The bandwidth can be further widened by increasing the number of oscillators as depicted in FIG. 6a. Thus, the design concept provides more freedom in defining trade-offs between gain of the response (higher sensitivity) and the system bandwidth (increased robustness), typically guided by application requirements.

Figure 6B:
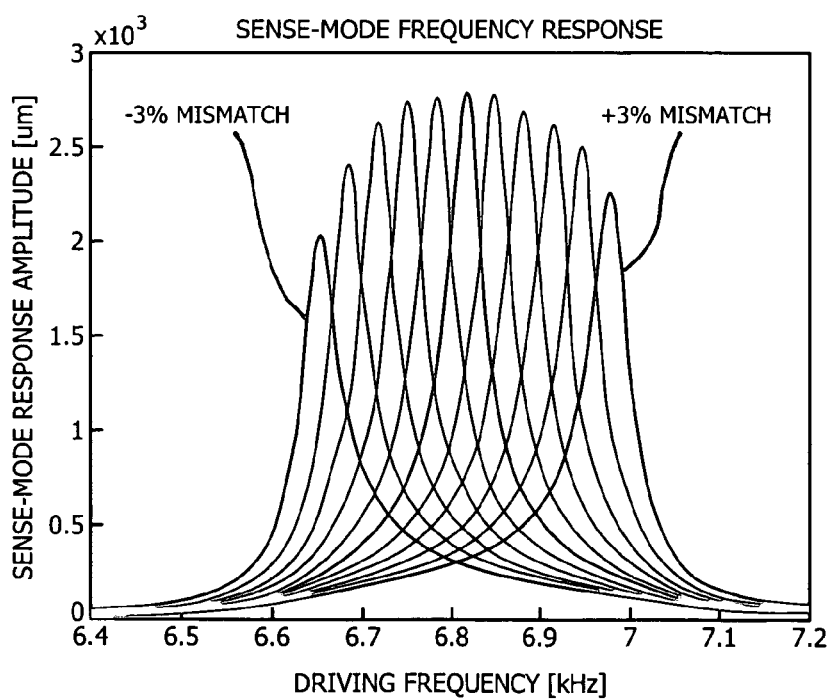
FIG. 6b is a graph illustrating the results of frequency mismatch on the overall system response. A mismatch of 3% results in only 16% error, while mismatches less than 1% have no significant effect.

FIG. 6b illustrates the case of a potential shift in the sense-mode resonance frequency, e.g. due to temperature fluctuations, residual stresses, or fabrication variations. It is observed that the response amplitude is sustained at a constant value to a great extent without requiring feedback control or active tuning of resonance frequencies. For example, a 3% shift in the sense-mode resonance frequency results in only 16% error in the response amplitude, while mismatches less than 1% have no significant effect on the response. Without active compensation, a conventional 2-DOF gyroscope can exhibit over 60% error for the same 1% frequency shift under the same operation conditions.

Finite Element Analysis Results

Figure 7A:
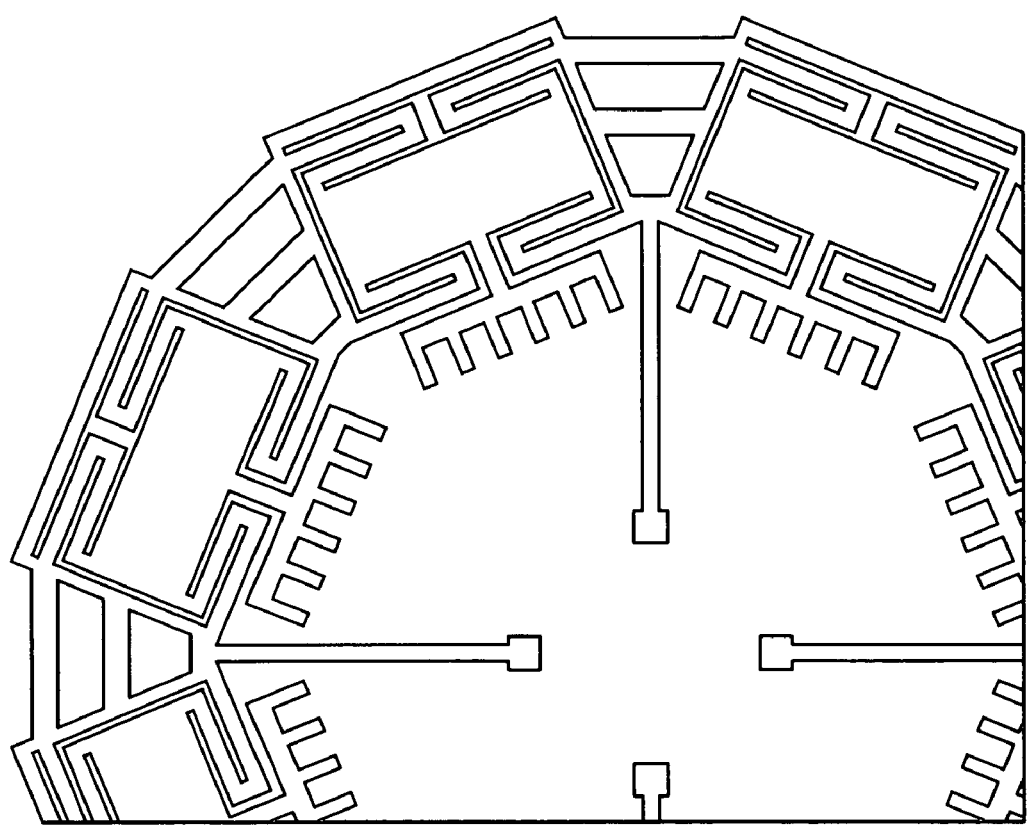
FIG. 7a is a FEA simulation result showing the linear in-plane resonance mode of the drive oscillators, obtained at 7.74 kHz.
Figure 7B:
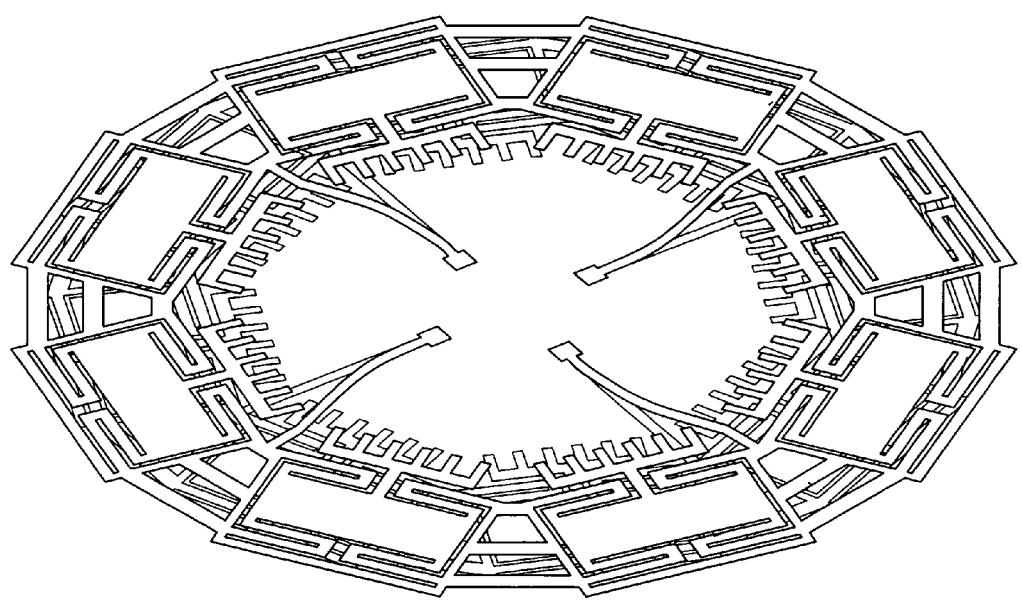
FIG. 7b is a FEA simulation result showing the torsional sensing mode of the complete structure, optimized $\omega_z$=7.54 kHz.

In order to optimize the system parameters and demonstrate the validity of the theoretical analysis assumptions, the operational modes of the system 10 were simulated using the Finite Element Analysis package MSC Nastran/Patran. Each drive-mode mass 20 of the analyzed prototype system is 1240 μm×770 μm, suspended by four 350 μm×7 μm folded springs; yielding a resonance frequency estimation of 7.80 kHz with 159 GPa elastic modulus. Through finite element analysis (FEA) simulations, the resonance frequency of the drive-mode oscillators 12 were obtained at 7.74 kHz as depicted in FIG. 7a. The torsional sense mode resonance frequency of the structure about the sense axis was then located at $\omega_z$=7.54 kHz in FIG. 7b with four 296 μm×10 μm torsional suspension beams, by iteratively optimizing the beam length.

Fabrication of Prototypes

Figure 8A:
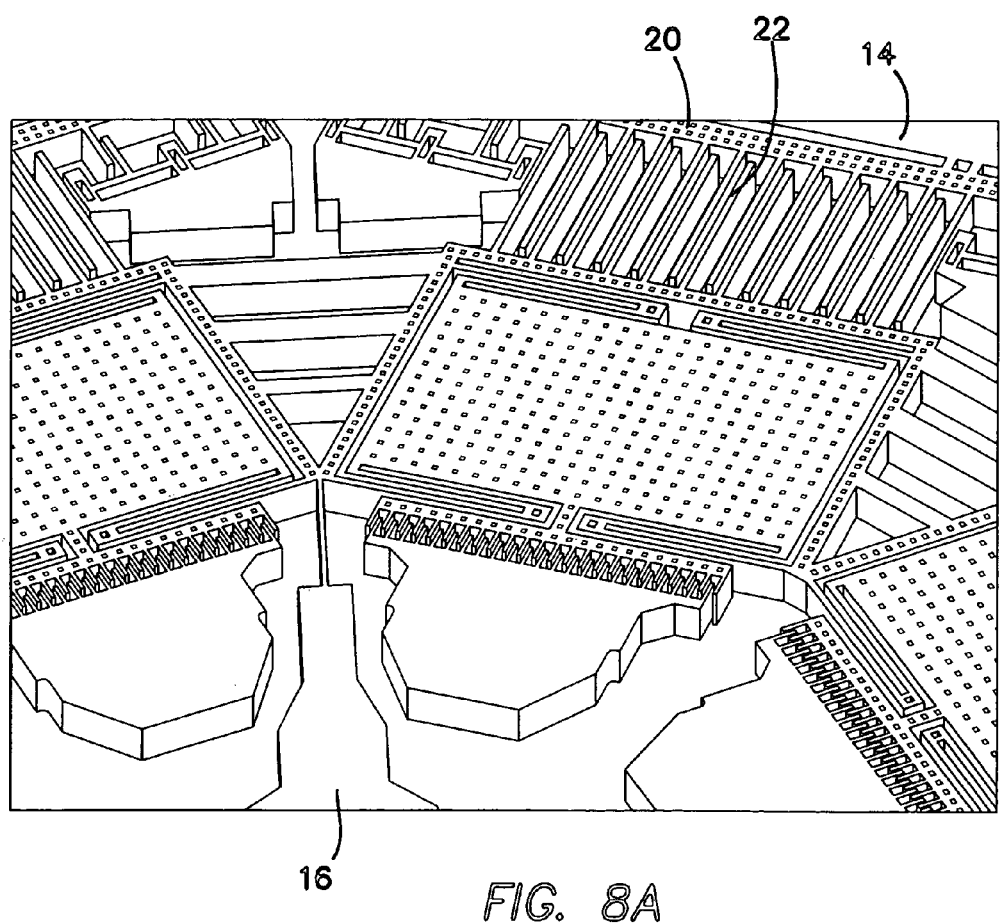
FIG. 8a is a SEM micrograph of the characterized prototype structure employing comb-drive actuation for large drive amplitudes.
Figure 8B:
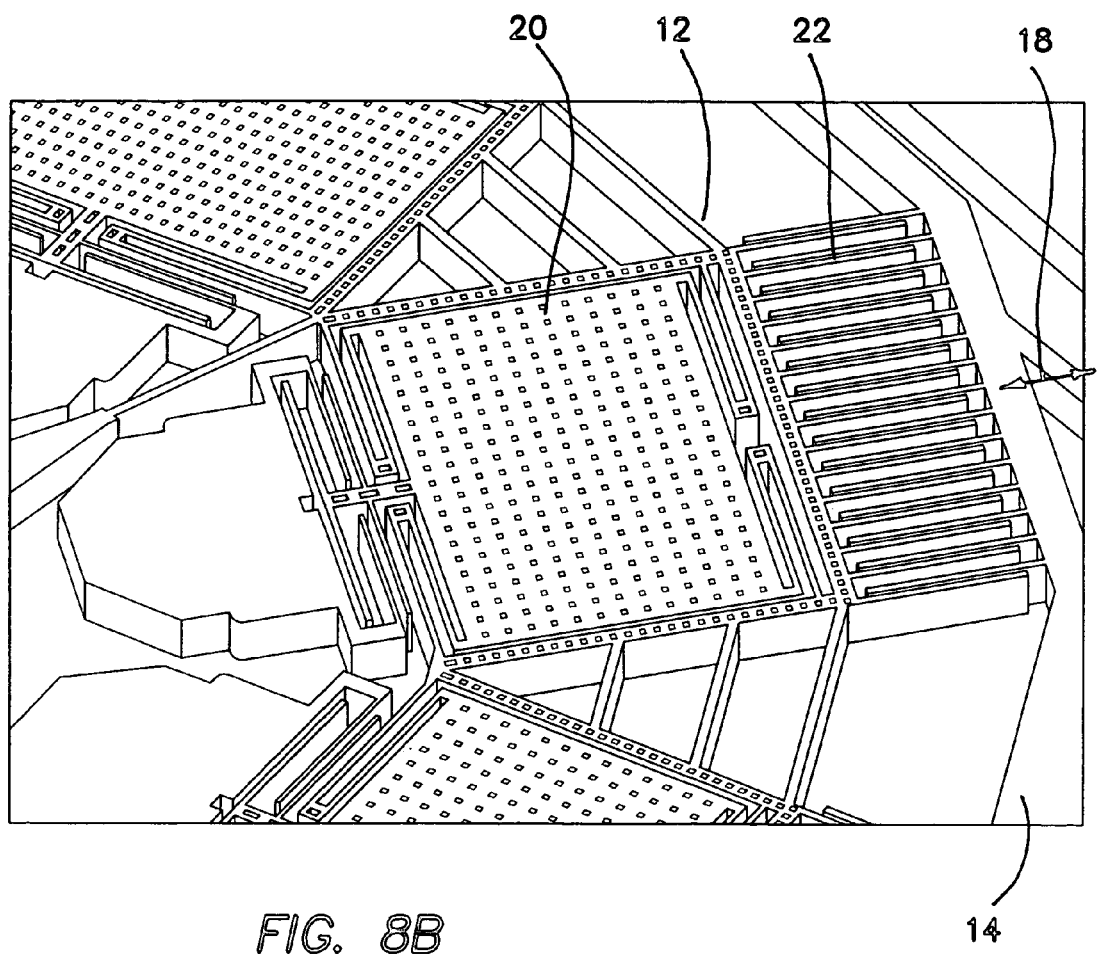
FIG. 8b is a SEM micrograph of the characterized prototype structure employing parallel-plate actuation for a wide electrostatic tuning range.

The bulk-micromachined prototype gyroscopes were fabricated as shown in the microphotographs of FIGS. 8a and 8b. Two different prototype structures were designed: (1) one structure employing comb-drive actuation to achieve large drive amplitudes, and (2) one structure employing parallel-plate actuation for a wide electrostatic tuning range. For the fabrication of prototypes, a one-mask process based on SOI (Silicon on Insulator) wafers was developed and optimized for high-aspect ratio structures. The developed process relies on deep-reactive ion etching (DRIE) through the 100 μm device layer, and front-side release of the structures by etching the oxide layer in HF solution. The process and the device design was optimized to minimize notching at the oxide interface and excessive undercutting. In the device, 15 μm×15 μm holes were used to perforate the suspended structures, and 10 μm gaps were used in the sensing and actuation electrodes. Each drive mode oscillator 12 was designed identically, although it will be shown below that the natural frequency of each oscillator 12 will be shifted due to fabrication imperfections.

Experimental Characterization Results

Figure 9:
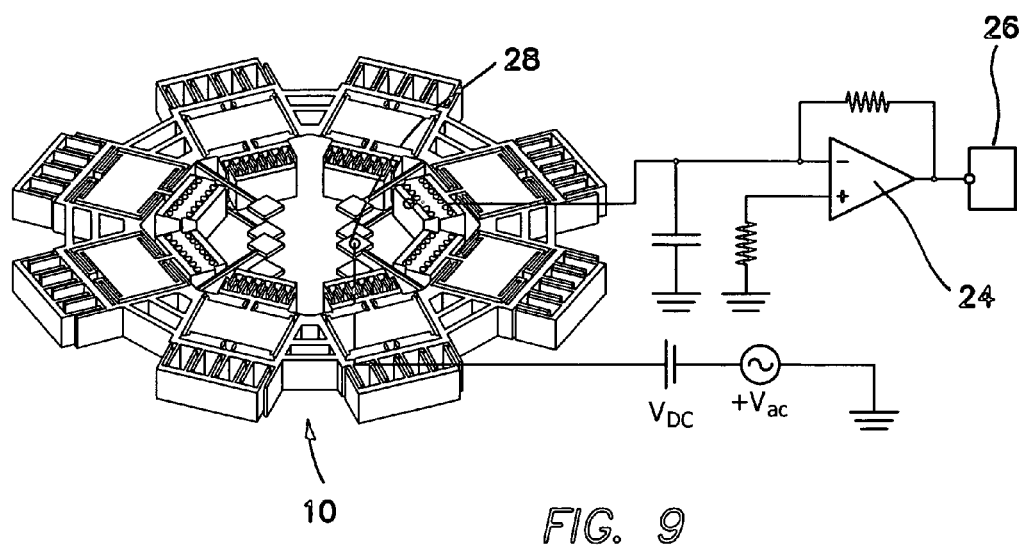
FIG. 9 is a diagram of a one-port actuation and detection apparatus, where a single electrode is used for both driving and sensing.
Figure 10:
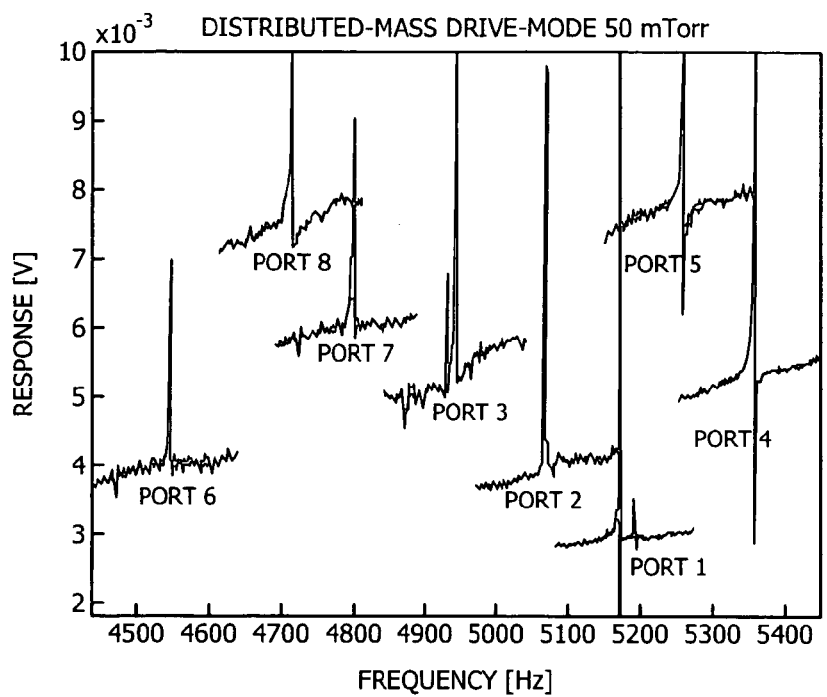
FIG. 10 is a graph which illustrates the experimental frequency response measurements of the eight drive-ports at 50 mTorr pressure.

The frequency response of the linear drive-mode oscillators 12 and the torsional sense-mode of the prototype gyroscope 10 were measured in a cryogenic MMR Probe Station diagrammatically depicted in FIG. 9. The frequency response of the device 10 was acquired under varying pressure values and at room temperature, using off-chip transimpedance amplifiers 24 connected to an HP Signal Analyzer 26 in sine-sweep mode. The drive-mode frequency responses were acquired utilizing one-port actuation and detection as diagrammatically depicted by the measurement setup of FIG. 9, where a single electrode was used for both driving and sensing at the same time. The driving AC signal, $v_{ac}$, plus the DC bias voltage, $V_{dc}$, is imposed on the gyroscope structure 10 through anchors 28, and the actuation and detection port is directly connected to the transimpedance amplifier 24. The resonance frequencies of the eight different comb-drive actuated drive-mode resonators were observed to be scattered between 4.546 kHz and 5.355 kHz within a 809 Hz frequency band as depicted in FIG. 10. This random separation of the identically designed drive-mode resonance frequencies results from the fabrication imperfections. The deviation from the FEA results could be attributed to excessive lateral over-etching during DRIE, the resolution of the mask used in fabrication, and the exposure and development steps of the photolithography process.

Figure 11:
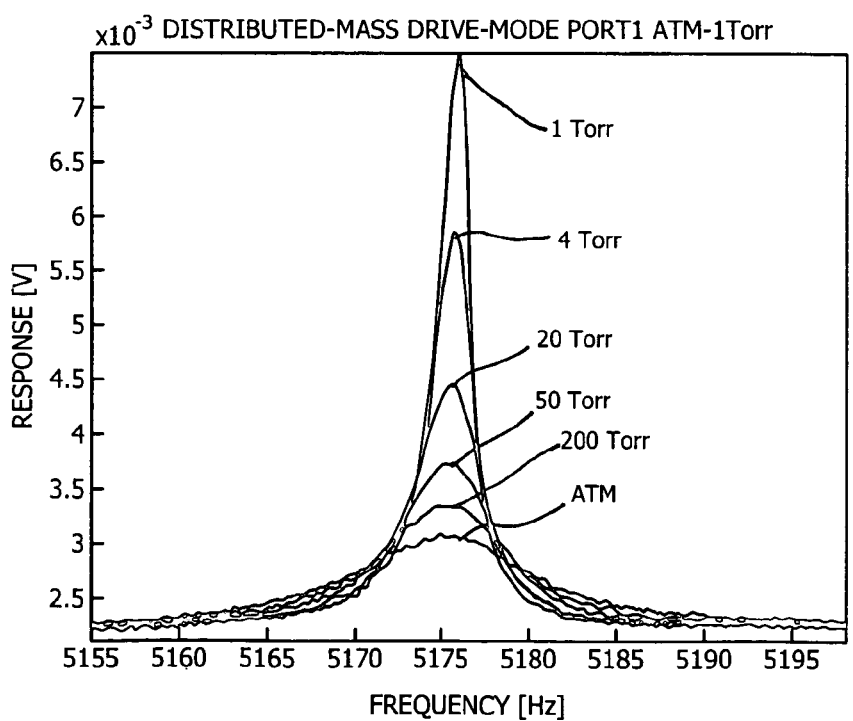
FIG. 11 is a graph which illustrates the experimental measurements of the drive-mode frequency response of one of the oscillators at different pressure values.
Figure 12:
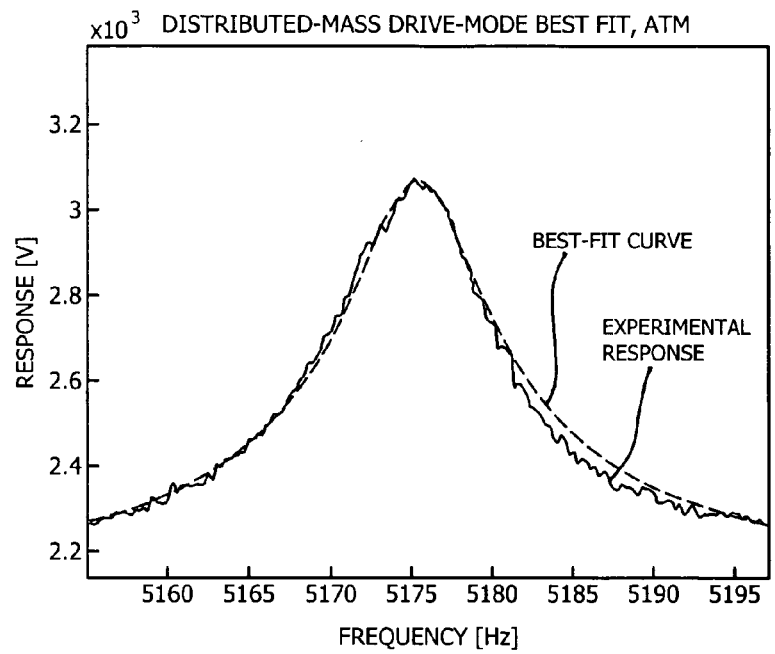
FIG. 12 is a graph which illustrates the least-squares curve fit for the response data at atmospheric pressure.

FIG. 11 is a graph which presents the experimentally acquired frequency responses of the Port-1 oscillator, from atmospheric pressure to 1 Torr. For exact calculation of the Q factor and the bandwidth, least-squares curves were fit to each experimental data curve as shown in FIG. 12. Starting with the oscillator mass of $1.03 \times 10^{-7}$ kg, the remaining dynamical parameters were extracted. The calculated Q factor and the bandwidth for each pressure value are presented in the Table below.

| Drive-Mode | | | Sense-Mode | |
| --- | --- | --- | --- | --- |
| Pressure | Q Factor | BW | Pressure | Q Factor |
| 1 Torr | 4187 | 1.24 Hz | 1 Torr | 921 |
| 4 Torr | 2912 | 1.78 Hz | 10 Torr | 430 |
| 20 Torr | 1861 | 2.78 Hz | 100 Torr | 119 |
| 50 Torr | 1339 | 3.87 Hz | 200 Torr | 87 |
| 200 Torr | 985 | 5.25 Hz | ATM | 42 |
| ATM | 598 | 8.65 Hz | | |

Figure 13A:
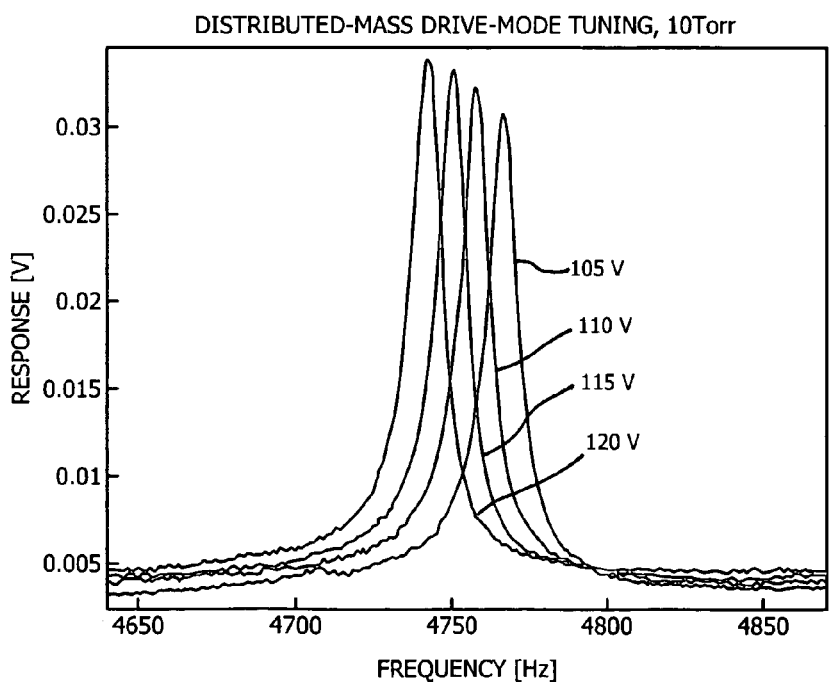
FIG. 13a is a graph which illustrates the shifting of the resonance frequencies of the parallel-plate oscillators with increasing DC bias.
Figure 13B:
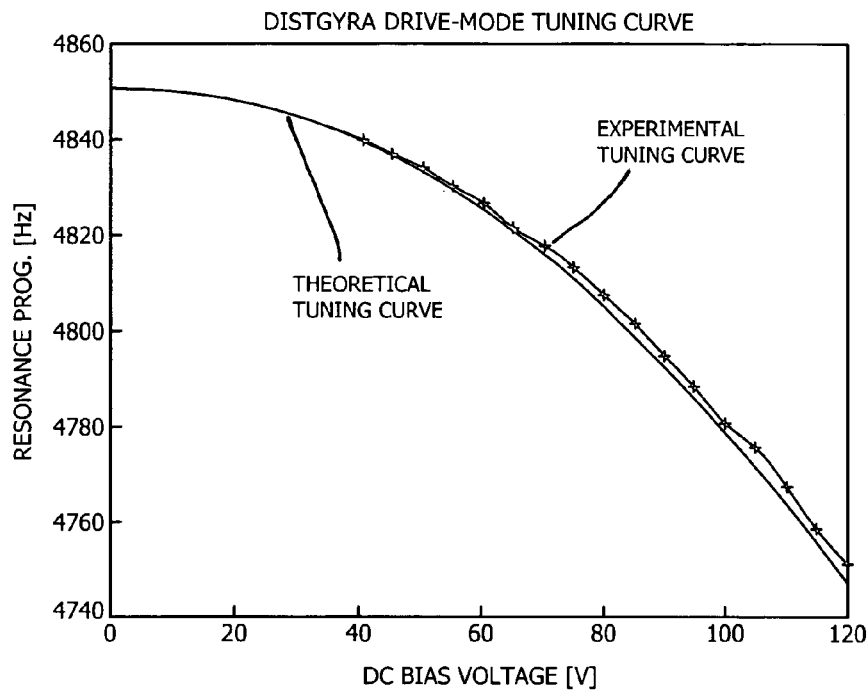
FIG. 13b is a graph which illustrates the theoretical drive-mode tuning curve obtained using the negative electrostatic spring model and the experimental tuning data.

The bandwidth of the response reduces from 8.65 Hz to 1.24 Hz when the ambient pressure is reduced to 1 Torr. The bandwidth of the drive-mode response even at atmospheric pressure was observed to be too narrow to achieve wide-band operation without electrostatic tuning of the drive-mode frequencies. In order to achieve a wider range of electrostatic tuning, the prototype with the parallel plate actuated drive-mode oscillators as shown in FIG. 1 was tested, and the resonance frequencies of the parallel-plate actuated oscillators were electrostatically tuned to achieve uniform and smaller separation of frequencies. Electrostatic frequency tuning using parallel-plate electrodes is a well-known phenomenon resulting from the nonlinear force profile. Taking the derivative of the electrostatic force with respect to displacement, the negative electrostatic spring constant becomes:

$$k_{el} = \frac{\partial F_{PP}}{\partial x} = -\frac{\varepsilon_0 A}{d_0^3} V_{DC}^2$$

where $\varepsilon_0 = 8.854 \times 10^{12}$ F/m is the dielectric constant, $A = 1080 \times 100$ μm is the total actuation area, $d_0 = 15$ μm is the electrode gap, and $V_{DC}$ is the DC bias voltage. In FIG. 13a, the resonance frequencies of one of the parallel plate oscillators is observed to shift, with increasing DC bias. FIG. 13b presents the theoretical drive-mode tuning curve, obtained using the negative electrostatic spring model, and the experimental tuning data obtained from the same parallel-plate oscillator.

Figure 14A:
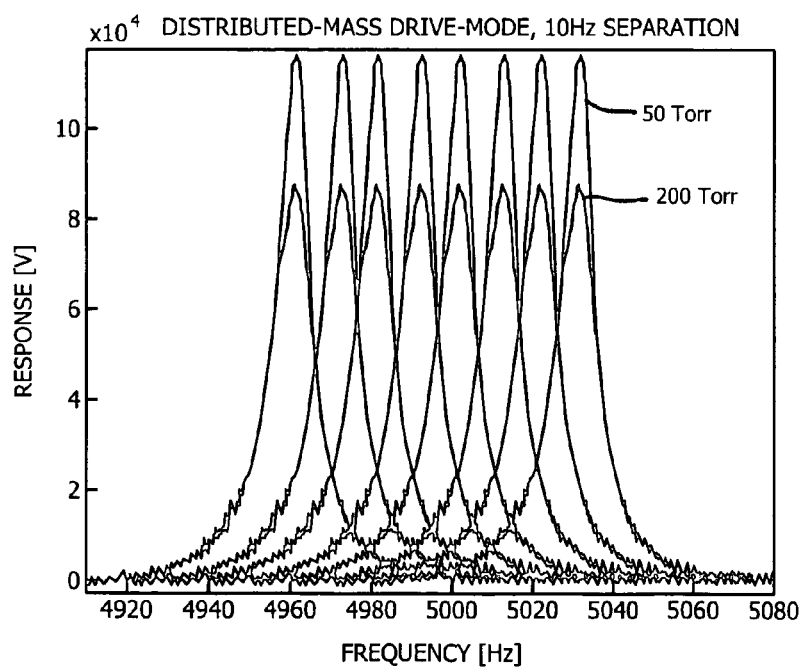
FIG. 14a is a graph which illustrates the normalized frequency response of the parallel-plate drive-mode oscillators after tuning for 10 Hz spacing.
Figure 14B:
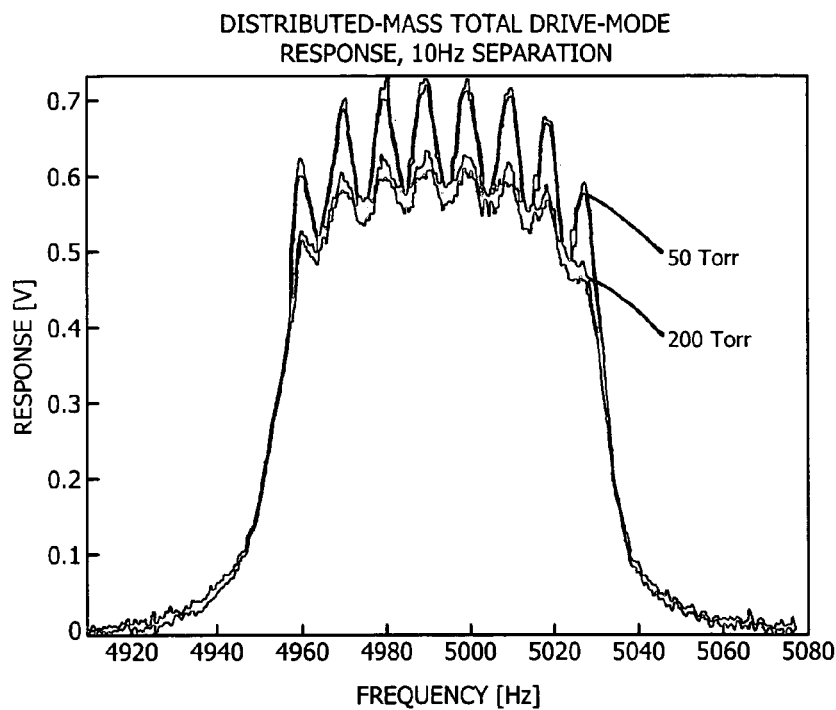
FIG. 14b is a graph which illustrates the experimental frequency response measurements of the total Coriolis force induced in the sense-mode obtained by summing the measured drive-mode response of the drive ports.

After electrostatic tuning of the parallel-plate oscillators 12 for 10 Hz spacing as shown in FIG. 14a, the close spacing of the drive-mode resonance frequencies allowed all of the resonators to be excited together to jointly generate a resultant Coriolis torque. The total Coriolis torque, which is estimated by summing the experimentally measured response of the eight drive-ports, was observed to provide a flat range of over 140 Hz as depicted in FIG. 14b. When the experiments were repeated at reduced pressures, the resonance peaks in the flat region of the overall response became more emphasized. Thus, 200 to 300 Torr is the optimal pressure for the parallel-plate devices to achieve a flat wide bandwidth drive-mode response with 10 Hz spacing.

Figure 15:
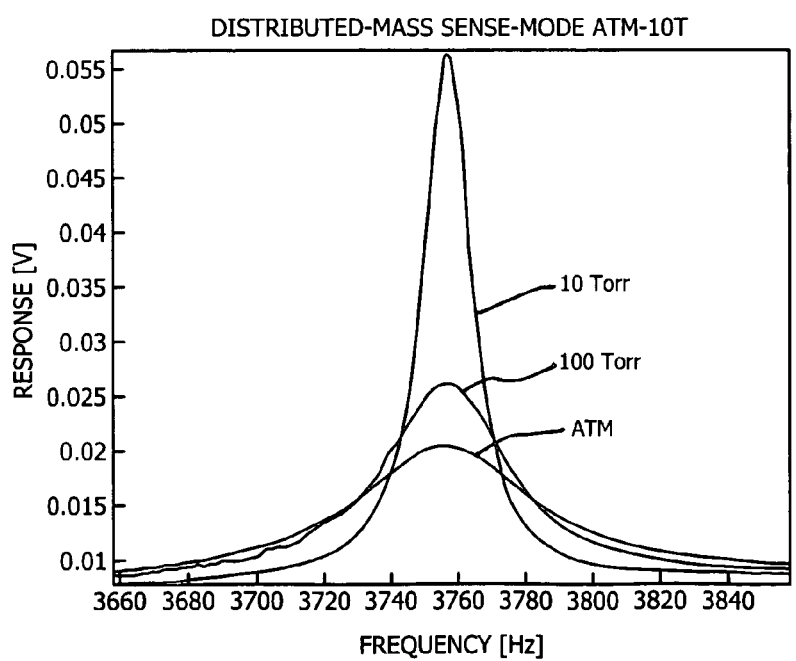
FIG. 15 is a graph which illustrates the experimental measurements of the torsional sense mode frequency response with changing damping.
Figure 16:
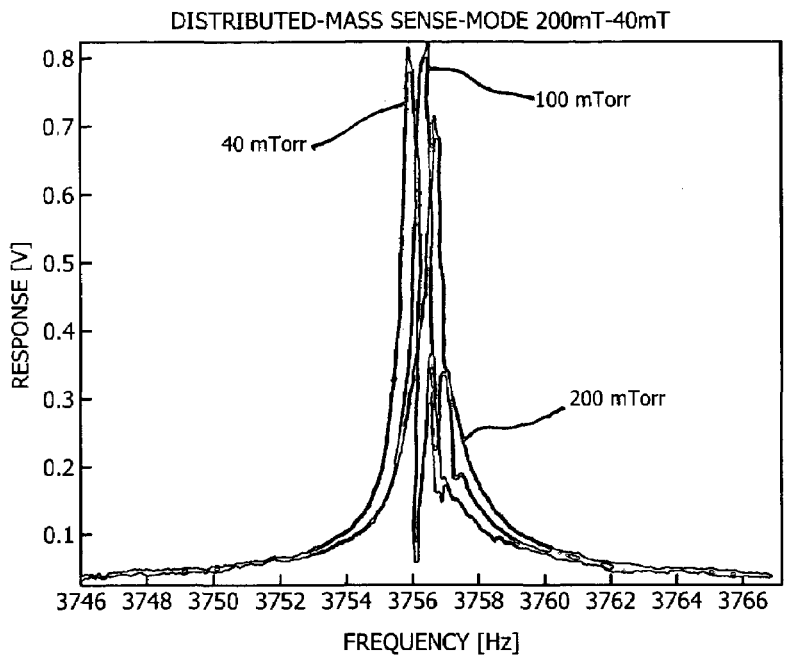
FIG. 16 is a graph which illustrates the response amplitude as a function of frequency which was not observed to increase for pressures lower than 100 mTorr.

The sense-mode resonance frequency of the frame was measured at 3.758 kHz with 20V DC bias voltage. FIG. 15 presents the experimentally acquired frequency responses of the torsional sense-mode, from atmospheric pressure to 10 Torr. When the ambient pressure was reduced to 10 Torr, the sense-mode response amplitude was observed to increase 2.25 times. However, the increase in the response amplitude was observed to diminish at pressures lower than 200 mTorr as depicted in FIG. 16. Also, the resonance frequency was observed to decrease with decreasing pressure after 200 mTorr, due to the vanishing of the spring-effect of squeeze-film damping.

Figure 17:
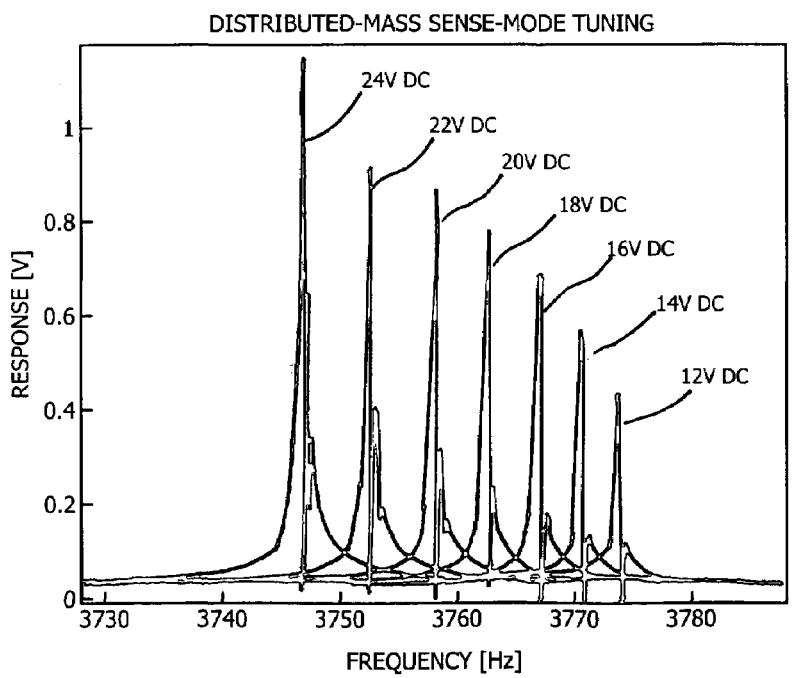
FIG. 17 is a graph of the sense mode resonance at various applied DC biases.

The sense-mode resonance frequency of the frame was also electrostatically tuned by changing the applied DC bias as shown in FIG. 17. With 50V DC bias voltage, resonance frequency was detected at 3.635 kHz, and 6 Hz average reduction in resonance frequency was observed for 1V change in DC bias. Also, since the induced current at the electrode is proportional to the DC bias, the amplitude of the detected signal in FIG. 17 is observed to increase with increasing DC bias.

Consequently, at pressures around 200 Torr, the parallel plate devices were observed to provide a flat wide-bandwidth drive-mode response with individual tuning for 10 Hz spacing, and sufficient off-resonance sense-mode gain. Prototypes can be fabricated using higher resolution masks to minimize random scattering of the drive-mode resonance frequencies, thus allowing using comb drive oscillators for larger drive-mode amplitudes. The sense-mode resonance frequency will also be designed slightly higher than drive-mode frequencies, for tuning down to the center driving frequency.

In summary, a distributed-mass micromachined gyroscope design is disclosed that is based on defining multiple drive mode oscillators, distributed symmetrically around the center of a supporting frame. The frequency response of the linear drive-mode oscillators and the torsional sense-mode of the prototype gyroscope were measured under varying pressure values. The resonance frequencies of the comb drive actuated drive-mode resonators were observed to be scattered within a 809 Hz frequency band, due to the mask resolution and the fabrication imperfections. The bandwidth of the drive-mode response even at atmospheric pressure was observed to be too narrow to achieve wide-band operation without electrostatic tuning of the drive-mode frequencies. After electrostatic tuning of the parallel-plate oscillators 12 for 10 Hz spacing, the close spacing of the drive mode resonance frequencies allowed all of the resonators to be excited together to jointly generate a resultant Coriolis torque. The total Coriolis torque was observed to provide a flat range of over 140 Hz, experimentally demonstrating the feasibility of the wide-bandwidth drive mode.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to, be understood to include what is specifically illustrated and described above, what is conceptionally equivalent, what can be obviously substituted and also what essentially incorporates the essential idea of the invention.

We claim:

1. A distributed-mass micromachined gyroscope comprising:
   a supporting frame having a center of symmetry; and
   multiple drive mode oscillators distributed symmetrically around the center of the supporting frame and coupled thereto, the multiple drive mode oscillators arranged and configured to have incrementally spaced drive mode resonance frequencies to allow all of the multiple drive mode oscillators to be excited together to jointly generate a resultant Coriolis torque, so that the Coriolis torque defines a wide-bandwidth drive mode.

2. The distributed-mass micromachined gyroscope of claim 1 where the multiple drive mode oscillators each include comb drive actuation.

3. The distributed-mass micromachined gyroscope of claim 1 where the multiple drive mode oscillators each include parallel plate actuation.

4. The distributed-mass micromachined gyroscope of claim 1 where the frame lies in a tangential plane, where the multiple drive mode oscillators each have a drive axis lying in the tangential plane and are driven in phase with each other.

5. The distributed-mass micromachined gyroscope of claim 4 where the frame has a multiplicity of tangent sides with a corresponding tangential direction, and where each of the multiple drive mode oscillators are driven in a direction normal to one of the multiplicity of tangent sides of the frame, and where each of the multiple drive mode oscillators are constrained in the tangential direction with respect to the frame.

6. The distributed-mass micromachined gyroscope of claim 1 where the frame has an anchored center and where multiple drive mode oscillators are distributed symmetrically around the anchored center of the frame.

7. The distributed-mass micromachined gyroscope of claim 5 where the frame has an anchored center and where multiple drive mode oscillators are distributed symmetrically around the anchored center of the frame.

8. The distributed-mass micromachined gyroscope of claim 7 where the drive axis of each of the multiple drive mode oscillators is radially directed with respect to the anchored center of the frame.

9. The distributed-mass micromachined gyroscope of claim 8 where each of the multiple drive mode oscillators includes a corresponding sensing capacitor and where in the presence of an angular rotation rate about a z axis, which is perpendicular to the frame, Coriolis forces are induced on each of the multiple drive mode oscillators orthogonal to each corresponding drive-mode oscillation direction so that each of the induced Coriolis forces lie in the tangential direction in the plane of the frame and combine to generate a resultant torque on the frame with a net Coriolis torque exciting the frame into torsional oscillations about the z-axis, which are detected by the sensing capacitors for angular rate measurement.

10. The distributed-mass micromachined gyroscope of claim 1 where each of the multiple drive mode oscillators include a drive actuation which applies a corresponding drive force to the drive mode oscillator and a sensing electrode attached to the frame to sense movement of the drive mode oscillator, and where the multiple drive mode oscillators have radial symmetry with respect to each other so that the drive forces applied to the drive-mode oscillators cancel out in all directions due to the radial symmetry and a net driving force on the gyroscope reduces to substantially zero, where the sensing electrodes do not deflect with respect to the frame due to drive-mode oscillations, so that instability and drift due to mechanical coupling between drive and sense modes is minimized, and complete decoupling of multi-directional linear drive-mode and a rotational sense-mode is achieved.

11. The distributed-mass micromachined gyroscope of claim 1 where the gyroscope is nominally operated in a flat region of a Coriolis torque frequency response by arrangement of the incremental spacing of drive mode resonance frequencies and where a sense-mode resonance frequency of the gyroscope is designed to be in the same frequency band so that the requirement on the degree of mode-matching is relaxed and robustness against structural and thermal parameter fluctuations is achieved.

12. The distributed-mass micromachined gyroscope of claim 11 where each of the multiple drive mode oscillators has a bandwidth and where the frequency separation of the incremental spacing of drive mode resonance frequencies between each of the multiple drive mode oscillators is less than the bandwidth of one oscillator.

13. The distributed-mass micromachined gyroscope of claim 12 where each of the multiple drive mode oscillators includes a parallel plate actuator and where each of the multiple drive mode oscillators were electrostatically tuned to achieve uniform and smaller separation of drive mode resonance frequencies.

14. The distributed-mass micromachined gyroscope of claim 1 where each of the multiple drive mode oscillators includes a sensing electrode with a corresponding sense-mode resonance frequency, the sense-mode resonance frequency being designed higher than the corresponding drive-mode frequency for tuning down to a center driving frequency.

15. A method of operating a micromachined gyroscope comprising:
    driving multiple drive mode oscillators at incrementally spaced drive mode resonance frequencies, the multiple drive mode oscillators distributed symmetrically around a center of a supporting frame and coupled thereto, the supporting frame having a center of symmetry to allow all of the multiple drive mode oscillators to be excited together to jointly generate a resultant Coriolis torque, so that the Coriolis torque defines a wide-bandwidth drive mode; and
    sensing the resultant Coriolis torque applied to the frame by the multiple drive mode oscillators, when the gyroscope is accelerated.

16. The method of claim 15 where driving the multiple drive mode oscillators comprises driving each of the multiple drive mode oscillators with a comb drive actuation.

17. The method of claim 15 where driving the multiple drive mode oscillators comprises driving each of the multiple drive mode oscillators with a parallel plate actuation.

18. The method of claim 15 where the frame lies in a tangential plane, and where driving the multiple drive mode oscillators comprises driving each of the multiple drive mode oscillators along a drive axis lying in the tangential plane and driving each of the multiple drive mode oscillators in phase with each other.

19. The method of claim 18 where the frame has a multiplicity of tangent sides with a corresponding tangential direction, and where driving the multiple drive mode oscillators comprises driving each of the multiple drive mode oscillators in a direction normal to one of the multiplicity of tangent sides of the frame, and constraining the motion of each of the multiple drive mode oscillators in the tangential direction with respect to the frame.

20. The method of claim 15 where the frame has an anchored center and where driving the multiple drive mode oscillators comprises driving the multiple drive mode oscillators in directions symmetrically distributed around the anchored center of the frame.

21. The method of claim 19 where the frame has an anchored center and where driving the multiple drive mode oscillators comprises driving the multiple drive mode oscillators in directions symmetrically distributed around the anchored center of the frame.

22. The method of claim 21 where driving the multiple drive mode oscillators in directions symmetrically distributed around the anchored center of the frame comprises driving each of the multiple drive mode oscillators in a radial direction with respect to the anchored center of the frame.

23. The method of claim 22 where each of the multiple drive mode oscillators includes a corresponding sensing capacitor and further comprising rotating the gyroscope about a z axis, which is perpendicular to the frame, inducing Coriolis forces in the tangential direction in the plane of the frame and orthogonal to each corresponding drive-mode oscillation direction in each of the multiple drive mode oscillators, generating a combined resultant torque on the frame with a net Coriolis torque, and exciting the frame into torsional oscillations about the z-axis, and where sensing the resultant Coriolis torque comprises detecting the torsional oscillations by the sensing capacitors for an angular rate measurement.

24. The method of claim 15 where driving the multiple drive mode oscillators comprises driving each of the multiple drive mode oscillators with a radial symmetry with respect to each other so that the drive forces applied to the drive-mode oscillators cancel out in all directions due to the radial symmetry and a net driving force on the gyroscope reduces to substantially zero, sensing motion of the frame derived from collective motion of the drive mode oscillators without deflection of sensing electrodes with respect to the frame due to drive-mode oscillations, minimizing that instability and drift due to mechanical coupling between drive and sense modes, and completely decoupling a multi-directional linear drive-mode and a rotational sense-mode.

25. The method of claim 15 further comprising operating the gyroscope in a flat region of a Coriolis torque frequency response by incrementally spacing the drive mode resonance frequencies, and detecting a sense-mode resonance frequency of the gyroscope in the same frequency band to relax the requirement on the degree of mode-matching and achieving robustness against structural and thermal parameter fluctuations.

26. The method of claim 25 where each of the multiple drive mode oscillators has a bandwidth and where incrementally spacing the drive mode resonance frequencies comprises separating the frequencies of the drive mode resonance frequencies between each of the multiple drive mode oscillators by less than the bandwidth of one oscillator.

27. The method of claim 26 where each of the multiple drive mode oscillators includes a parallel plate actuator and further comprising electrostatically tuning each of the multiple drive mode oscillators to achieve uniform and smaller separation of drive mode resonance frequencies.

28. The method of claim 15 where each of the multiple drive mode oscillators includes a sensing electrode with a corresponding sense-mode resonance frequency, where driving the multiple drive mode oscillators comprises tuning down to a center driving frequency by setting the sense-mode resonance frequency at a higher frequency than the corresponding drive-mode frequency.

* * * * *